United States Patent [19]

Kückens

[11] Patent Number: 5,044,117

[45] Date of Patent: Sep. 3, 1991

[54] METHOD FOR ROOT FERTILIZATION IN CULTIVATED PLANTS

[75] Inventor: Alexander Kückens, Gross Sarau, Fed. Rep. of Germany

[73] Assignee: Technica Entwicklungsgesellschaft mbH & Co. KG, Ratzeburg, Fed. Rep. of Germany

[21] Appl. No.: 577,047

[22] Filed: Aug. 31, 1990

Related U.S. Application Data

[63] Continuation of Ser. No. 210,597, Jun. 23, 1988, abandoned.

[30] Foreign Application Priority Data

Jun. 23, 1987 [DE] Fed. Rep. of Germany ....... 3720621

[51] Int. Cl.$^5$ ............................................. A01G 31/02
[52] U.S. Cl. ........................................... 47/59; 47/62
[58] Field of Search ................................ 47/59, 62, 60

[56] References Cited

U.S. PATENT DOCUMENTS

| 4,166,341 | 9/1979 | Vestergaard | 47/59 |
| 4,675,165 | 6/1987 | Kückens et al. | 47/48.5 X |
| 4,689,067 | 8/1987 | Kückens et al. | 71/3 |

FOREIGN PATENT DOCUMENTS

| 62966 | 10/1982 | European Pat. Off. | 47/59 |
| 3330375 | 3/1985 | Fed. Rep. of Germany | 47/62 |
| 3503710 | 6/1986 | Fed. Rep. of Germany | 47/62 |

Primary Examiner—Danton D. DeMille
Attorney, Agent, or Firm—Herbert Dubno

[57] ABSTRACT

A method of root fertilization in cultivated plants, particularly in the field of hydrophonics is provided wherein water is finely impregnated with a gas mixture of carbon dioxide and pure oxygen, whereby the mixing ratio of the carbon dioxide and the pure oxygen corresponds approximately to the natural solution ratio of carbon dioxide and oxygen in normally clean water at atmospheric pressure and room temperature and whereby the individual gaseous phases, respectively their inflow to the gas mixture, can be controlled when required from the gas mixing area.

4 Claims, No Drawings

METHOD FOR ROOT FERTILIZATION IN CULTIVATED PLANTS

This is a continuation of co-pending application Ser. No. 07/210,597 filed on 23 Jun. 1988 now abandoned.

The invention relates to a method for the fertilization of roots in cultivated plants, especially in hydrocultures, wherein water or an aqueous fertilizer solution is impregnated with a mixture of $CO_2$ and $O_2$ and directed towards the root area of the cultivated plants.

From the German open specification No. 35 03 710 there is known a method for the fertilization of leaves in cultivated plants using $CO_2$-impregnated water, wherein $CO_2$ is added to the water up to a content corresponding approximately to the natural saturation of the water. In order to impregnate with $CO_2$, large qunatities of water are necessary for spraying and fertilization in horticulture or in agriculture. In the most stable and economical way, the U.S. Pat. No. 4,675,165 teaches a method and an installation for the impregnation of water with $CO_2$. The installation proposed for carrying out the method has a straight flow channel open at the exit end, whose other end is connectable to a source of water under pressure, particularly to the usual water supply system. In operation, the flow channel is filled up completely over its entire length and its entire cross section by a quiet, nearly turbulence-free water stream. At several locations, interspersed in the direction of flow, the flow cross-section widens suddenly over an annular shoulder of small size, of for instance 1 mm or even less. The outer flow portions of the water stream, flowing over this shoulder are thereby considerably accelerated in this limited shoulder area relative to the flow in the same flow cross section. As a result there is a corresponding pressure drop in this narrowly limited area downstream of the shoulder. In this area, the flow channel has several open bores, distributed circumferentially, whose width corresponds approximately to the width of the annular shoulder. At the outer end, the bores abut a gas chamber connected to a compressed-gas source for pure $CO_2$. In operation the water is supplied to the flow channel at the usual temperature and under the usual pressure of the water source, particularly of the water supply system. The pressure of the gas in the $CO_2$ gas chamber is set to a value which is slightly lower than the static pressure of the water stream in the flow channel. If the latter is, for instance, equivalent to 3 bar, the pressure of the gas in the chamber is kept, for instance, at approximately 2.5 bar. In the shoulder areas, the $CO_2$-gas from the gas chamber enters the outer water flow portions, due to the pressure fall limited to these locations. This way, a negative-pressure impregnation of the water with $CO_2$-gas, confined to these narrow locations, is obtained, resulting in a very stable fine impregnation of the water with $CO_2$. The number of the successive shoulder areas determines among other things the content of the carbon dioxide gas absorbed by the water. Thereby, the $CO_2$-content of the water is preferably kept at values under 3 g per liter of water, advantageously within the range of 0.05 and 2.5 g per liter of water.

This water finely impregnated with $CO_2$ is immediately, or after the addition of fertilizers and/or plant protection substances, directed to the soil either directly, e.g. through sprinklers, or finely misted or sprayed with common spraying devices for the fertilization of leaves.

In this manner the required quantities of $CO_2$ and $H_2CO_3$ necessary for a healthy growth, for a natural resistance against diseases and pests and for crop increase can be introduced into the soil or into the plants in a simple and economical manner. It is essential in this case that the content of carbon dioxide in the water be considerably higher than normally found in the water coming from the supply system. On the other hand, the natural absorption capacity of normal, clean water at environmental temperature and atmospheric pressure must not be significantly increased. This requirement is based on the fact that even small amounts of carbon dioxide insure the desired effect and that when the $CO_2$-content is limited, the losses of $CO_2$ remain very low during the distribution of the finely impregnated water in the sprinkler- or spraying systems.

However, for healthy growth of the plants, particularly the roots, a sufficient proportion of carbon dioxide and carbonic acid in the soil is not the only necessary factor. The soil has also to be supplied sufficiently with oxygen. Since in the upper soil strata, the atmospheric pressure and the gas composition are approximately equal to that of the atmosphere, an insufficiency of carbon dioxide gas leads also to an oxygen insufficiency. The soil air contains as known 20.93 vol.-% $O_2$ 0.03 vol.-% $CO_2$ and 78.10 vol.-% N. In a good humus soil, up to 5 kg of carbon dioxide gas is produced per hectare, and according to the Gay Lussac law, exchanged against proportional amounts of oxygen. Use of water finely impregnated with carbon dioxide gas also insures the supply of oxygen to the root area of soil-cultivated plants.

The relationship becomes much more problematic, however, in the case of hydroponic applications or hydrocultures. Here the roots are not surrounded by gas-containing soil, but only by water or by solutions containing nutrients. It is known that also in this field of application, the fine impregnation with carbon dioxide gas of the water used for hydroculture and the therefrom resulting adjustable content of chemically bound oxygen in the water is responsible for the health and growth of the cultures. This way, from the German open specification No. 26 41 945 a method for the soil-free cultivation of plants is known, wherein a plant-nutrient solution is guided in a closed circuit, wherein the used-up plant nutrients are replaced by supplying one or the other from two concentrated supply solutions, depending on the measured pH-value of the plant-nutrient solution, and wherein, with the aid of one or several pipe- or hose ducts, carbon dioxide under pressure is blown into the nutrient solution, so that the plants can absorb the carbon dioxide through their roots.

With respect to the gas exchange between $CO_2$ and $O_2$, the conditions existing in the water are completely different from the ones in the atmosphere. For instance, normally clean water at atmospheric pressure and at room temperature can absorb 0.88 l carbon dioxide gas, but only 0.03 l oxygen. Thus, when the water or the nutrient solution are impregnated with $CO_2$, there is danger that the absorbed carbon dioxide in the water will drive out the oxygen from the water, and will generally deprive the roots of the necessary supply of oxygen.

In the last-mentioned method reported German open specification No. 26 41 945 it is also known to blow air instead of the $CO_2$-gas or in addition thereto into the nutrient solution, through the perforations in the pipe- or hose ducts, in order to supply the nutrient solution also with oxygen. This known method is complicated and also does not lead to any certain and reproducible results. Also the supply of pure oxygen, based on the measurement of the content of carbon dioxide gas and oxygen, as well as the control of the oxygen supply and the corresponding control installations are cumbersome and costly and can hardly be used in practice. This applies also to the known case (compare European publication No. 0 062 966) wherein the fertilizer solution pumped in a closed circuit is atomized in a pressure container, containing oxygen and carbon dioxyde gas. There is intended achievement, through atomizing of the fluid in the pressure container, of corresponding impregnation of the fluid with the gases. In addition to the high capital costs required by the method, a disadvantage of the known method is that the gas content can hardly be accurately controlled and in the cultivated areas the gas losses are considerable.

In opposition thereto, it is the object of the present invention to further develop a method which can supply in a simple and cost-efficient manner the $CO_2$, $H_2CO_3$ and $O_2$ to the root areas of cultivated plants, especially hydrocultures, so that the process can be safe and properly supervisable.

Based on this method of this invention, $CO_2$ and $O_2$ is supplied to the water or the nutrient solution, in a stable mixing proportion. Since the two gases already present an initially stable mixing ratio, there is no need for neither test probes to measuring the $CO_2$-content or $O_2$-content in the water, nor a closed circuit through which the water or the aqueous fertilizer solution must be guided. Also, it is not necessary to provide a special dosing installation, or a control device acting between the probes and the dosing installation. The arrangement required for carrying out the method is therefore extremely simple, supervisable and insures in a cost-efficient manner perfectly reproducible results.

Further, it is essential that a constant mixing ratio between the gases be maintained, which corresponds to the natural proportion of these gases in clean water at room temperature. This way it is avoided that one gas expells the other from the solution. Thereby very stable conditions are achieved, which of course have a decisive influence on the reproducibility of the results.

It is particularly favorable for plant growth that in their root area practically natural conditions are maintained. Due to the absence of the expelling effect, no gas is lost from the fluid and this also contributes to cost savings.

A further important feature of the invention is that the $CO_2$-content is limited to values under 3 g per liter of water. Particularly advantageous is a range within 0.05 g per liter and 2.5 g per liter of water. The limitation of the $CO_2$-content leads automatically to a corresponding limitation of the $O_2$-content, due to their natural proportions in the water. Normal tap water contains the gases in amounts considerably lower than the natural dissolving capacity. Therefore, with the new method the water can to a considerable extent be adjustedly enriched with these gases, and thereby each value up to the maximal value can be set securely and reproducibly. Due to the predetermination of the upper limit of the gas content, gas loss can be prevented, even when the water or the aqueous fertilizer solution are violently or turbulently agitated.

The method of impregnation of the water with the gas mixture is also important for the stability of the gas content of the water. Hereby, the already known method of impregnation of the previously mentioned U.S. Pat. No. 4,675,165 can be advantageously used. This impregnation method is indispensable in order to achieve the desired purpose, since only the thereby conditioned stable dissolution of the gases in the water can lead to the mentioned advantages and can insure the required reproducibility of results.

From the U.S. Pat. No. 4,675,175, dosage valves for various flow quantities are known in the installations for the controlled irrigation of soil-free plant cultivation with the aid of fertilizer solutions. In these known installations the problem is to achieve stable conditions while using various water sources (well water, rain water). For this, the pH-values and values of electrical conductibility of the fertilizer solution are established. Based on these values, the target values are set for the preparation of the fertilizer solution. The installation also has a $CO_2$-dosage device. In order to take into account the various water qualities, the therefor provided dosage valves are differently laid out with respect to their flow rate, so that by opening one or several of the individual valves, each time different mixing proportions of well water and rain water can be obtained.

By contrast, the new method supplies to the area containing the gases to be mixed $CO_2$ and $O_2$ in the predetermined stable proportions, whereby the mixing ratio of $CO_2$ to $O_2$ in the gas mixture is advantageously kept at a stable value of 30:1.

In order to prepare the mixture, the $CO_2$ and $O_2$ can be supplied to the chamber containing the gas mixture each as a pure gas and individually, as well as under equal pressure but in different amounts per unit time. For this purpose, the two gases can be supplied advantageously to the chamber over flow cross sections whose size is adjusted according to the mixing ratio.

Advantageous results could already be observed when instead of the preferred mixing ratio, the mixture of $CO_2:O_2$ ranges between 20:1 and 40:1.

The water which has been finely impregnated in this manner can be used for irrigation. However it is used preferentially in hydroculture and in hydroponics. For this purpose, there can be added to the water impregnated as above, the required nutrients and trace elements.

If the nourishing water already from the start contains $CO_2$ or $O_2$ gases in a higher proportion, or the requirement of specific plants for one of the individual gases differs from the normal requirement, the supply of these individual gases can be controlled, for instance by changing the cross section of the supply flow to the gas chamber.

I claim:

1. A method for root fertilization in cultivated plants, employing an installation comprising a straight flow channel having an open exit at one end, a means for connecting to a water source at an opposite end, and means for introducing a gaseous mixture into said channel, said method comprising:

guiding an aqueous liquid through said straight flow channel;

impregnating into said aqueous liquid separate steams of carbon dioxide and oxygen in a ratio between 20:1 and 40:1 as measured at atmospheric pressure and room temperature, said aqueous liquid after impregnation containing from 0.05 to 2.5 g/l of carbon dioxide; and supplying said impregnated aqueous liquid to roots of said cultivated plants.

2. A method for root fertilization in cultivated plants, said method employing an installation comprising a straight flow channel having an open exit at one end, a means for connecting to a water source at an opposite end, said channel widening in cross sectional diameter perpendicular to a flow direction downstream over narrow annular shoulders at a plurality of locations, and a plurality of openings distributed circumferentially around said channel directly downstream from said shoulders, said openings corresponding in width to that of respective widths of the annular shoulders, said method comprising:

guiding an aqueous liquid through said straight flow channel;

directing outer flow portions of said guided aqueous liquid at least over two of said openings positioned along said cross section of said straight flow channel;

impregnating into said aqueous liquid subjected to passage along said openings separate streams of carbon dioxide and oxygen at a slightly lower pressure than that of a static pressure of said aqueous liquid, said streams of carbon dioxide and oxygen being in a ratio between 20:1 and 40:1 as measured at atmospheric pressure and room temperature, said aqueous liquid after impregnation containing from 0.05 to 2.5 g/l carbon dioxide; and supplying said impregnated aqueous liquid to roots of said cultivated plants.

3. Method according to claim 2, characterized in that the ratio of $CO_2$ and $O_2$ is kept at a constant value of approximately 30:1.

4. Method according to claim 2, characterized in that $CO_2$ and $O_2$ are supplied to a chamber containing the streams as pure gases and said $CO_2$ and $O_2$ being separately introduced to said chamber.

* * * * *